(12) United States Patent
Ishikawa

(10) Patent No.: US 8,948,916 B2
(45) Date of Patent: Feb. 3, 2015

(54) SENSOR RELAY CONTROL DEVICE

(75) Inventor: Takafumi Ishikawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/984,475

(22) PCT Filed: Feb. 9, 2011

(86) PCT No.: PCT/JP2011/052790
§ 371 (c)(1),
(2), (4) Date: Aug. 8, 2013

(87) PCT Pub. No.: WO2012/108022
PCT Pub. Date: Aug. 16, 2012

(65) Prior Publication Data
US 2013/0325180 A1 Dec. 5, 2013

(51) Int. Cl.
*G05B 15/00* (2006.01)
*B25J 9/16* (2006.01)

(52) U.S. Cl.
CPC ..... *B25J 9/1694* (2013.01); *G05B 2219/34012* (2013.01); *G05B 2219/40586* (2013.01); *Y10S 901/09* (2013.01); *Y10S 901/16* (2013.01); *Y10S 901/29* (2013.01); *Y10S 901/46* (2013.01)
USPC ............... 700/258; 700/250; 901/9; 901/16; 901/29; 901/46

(58) Field of Classification Search
USPC ................... 700/245, 248, 250, 252
See application file for complete search history.

(56) References Cited

U.S. PATENT DOCUMENTS

| | | | |
|---|---|---|---|
| 4,837,487 A | 6/1989 | Kurakake et al. | |
| 5,748,465 A | 5/1998 | Kaneko | |
| 6,278,902 B1 | 8/2001 | Hashimoto et al. | |
| 7,209,117 B2 * | 4/2007 | Rosenberg et al. | 345/156 |
| 2004/0138530 A1 * | 7/2004 | Kawai et al. | 600/152 |
| 2008/0188985 A1 | 8/2008 | Sakano | |

(Continued)

FOREIGN PATENT DOCUMENTS

| | | |
|---|---|---|
| CN | 101239467 A | 8/2008 |
| DE | 196 16 855 A1 | 1/1997 |

(Continued)

OTHER PUBLICATIONS

Taiwanese Office Action, mailed Oct. 25, 2013, Application No. 100117168.

(Continued)

*Primary Examiner* — Ian Jen
(74) *Attorney, Agent, or Firm* — Sughrue Mion, PLLC; Richard C. Turner

(57) ABSTRACT

A sensor relay control device generates feedback data based on sensor data including a plurality of components and being output by an external sensor installed at a portion of a joint of a robot and is connected to a robot control device that executes feedback control of the robot based on the feedback data. The sensor relay control device includes: a generating unit that imports sensor data output by the external sensor and performs coordinate conversion; a synchronizing unit that synchronizes the control data of each axis of the motors with a control cycle of the robot control device; and an outputting unit that outputs the control data of each axis of the motors synchronized with the control cycle of the robot control device to the robot control device as the feedback data.

2 Claims, 3 Drawing Sheets

(56) References Cited

U.S. PATENT DOCUMENTS

2009/0206787 A1    8/2009  Seki
2013/0325180 A1*  12/2013  Ishikawa .................. 700/258

FOREIGN PATENT DOCUMENTS

| | | |
|---|---|---|
| EP | 1 955 831 A2 | 8/2008 |
| JP | 60-177888 A | 9/1985 |
| JP | 9-34520 A | 2/1997 |
| JP | 11-33960 A | 2/1999 |
| JP | 2000-181522 A | 6/2000 |
| JP | 2002-96282 A | 4/2002 |
| JP | 2005-301940 A | 10/2005 |
| JP | 3945403 B2 | 7/2007 |
| JP | 2008-188722 A | 8/2008 |
| WO | 02/052715 A1 | 7/2002 |
| WO | 2006/095401 A1 | 9/2006 |

OTHER PUBLICATIONS

Chinese Office Action, mailed Sep. 3, 2014; Application No. 201180067300.6.

* cited by examiner

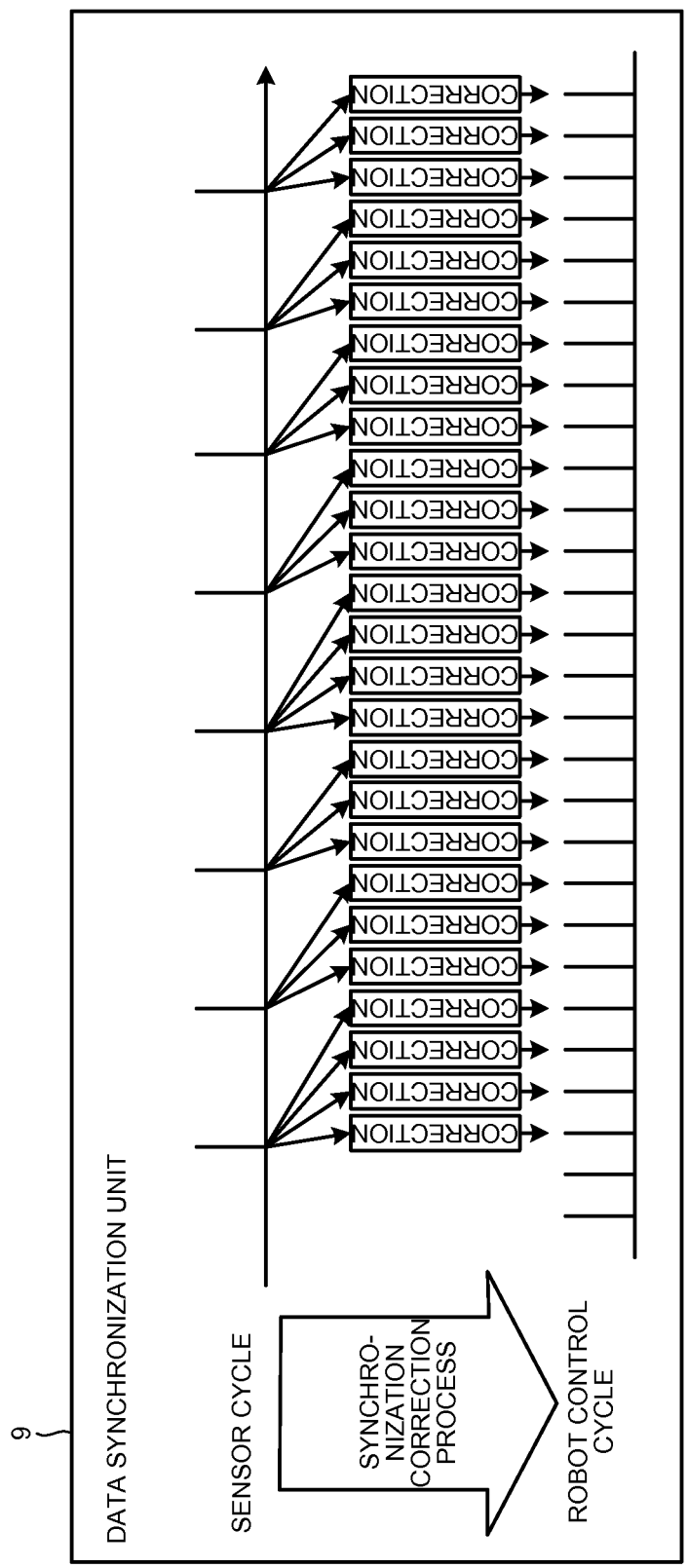

SENSOR RELAY CONTROL DEVICE

CROSS REFERENCE TO RELATED APLICATIONS

This application in a National Stage of International Application No. PCT/JP2011/052790 filed Feb. 9, 2011, the contents of all of which are incorporated herein by reference in their entirety.

FIELD

The present invention relates to a sensor relay control device that enables a robot control device to execute control to reflect feedback data of a force sensor or the like on an operation of a robot without degrading processing performance of the robot control device.

BACKGROUND

Conventionally, there are several modes of connection between a robot and an external sensor such as a force sensor.

An example of these modes is a mode in which a robot control device directly imports feedback data received from a force sensor, once performs processing of input information received from the sensor so that the input information can be used for control of a robot, synchronizes the processed information with a control cycle of the robot, and then corrects an operation of the robot according to the input information received from the sensor (see, for example, Patent Literature 1).

Another example is a mode in which a personal computer imports feedback data received from a force sensor, performs processing of input information received from the sensor so that the input information can be used for control of a robot, and outputs the processed information to a robot control device. In this mode, the robot control device that has imported the information synchronizes the input information received from the personal computer with a control cycle of the robot, and then corrects an operation of the robot according to the input information received from the sensor.

CITATION LIST

Patent Literature

Patent Literature 1: Japanese Patent Application Laid-open No. 2008-188722

SUMMARY

Technical Problem

In the former method, the robot control device needs to perform all the sequential processes of processing the input information received from the force sensor or the like for control of the robot and correcting the operation of the robot. Because the input information received from an external sensor is not always synchronized with the control cycle of the robot, there is a predictive factor in a process of generating the correction data. If the robot control device generates the correction data with a processing load that does not interfere with the control of the robot, prediction accuracy decreases and the correction data becomes unreliable. On the other hand, if prediction accuracy is increased, the processing load of the robot control device increases, which may interfere with the control of the robot.

Because communication between the computer and the robot control device is not always synchronized with the control cycle of the robot, there is a predictive factor in a process performed by the robot control device to generate the correction data also in the latter method, as in the former method. Therefore, if the robot control device generates the correction data with a processing load that does not interfere with the control of the robot, prediction accuracy decreases and the correction data becomes unreliable. On the other hand, if prediction accuracy is increased, the processing load of the robot control device increases, which may interfere with the control of the robot.

The present invention has been achieved to solve the above problems, and an object of the present invention is to provide a sensor relay control device that enables a robot control device to execute control to reflect feedback data of a force sensor or the like on an operation of a robot without increasing the processing load.

Solution to Problem

To solve the above problems and achieve the object according to an aspect of the present invention, a sensor relay control device that generates feedback data based on sensor data output by an external sensor installed at a portion of a joint of a robot and is connected to a robot control device that executes feedback control of the robot based on the feedback data, the sensor relay control device includes: a converting unit that imports sensor data output by the external sensor and converts the imported sensor data to control data of motors that move the joint of the robot; a synchronizing unit that synchronizes the control data of the motors with a control cycle of the robot control device; and an outputting unit that outputs the control data of the motors synchronized with the control cycle of the robot control device to the robot control device as the feedback data.

Advantageous Effects of Invention

The sensor relay control device according to the present invention outputs control data of the motors to the robot control device synchronously with the control cycle of the robot, which eliminates the need of a synchronization process in the robot control device. Accordingly, an increase in the processing load of the robot control device can be suppressed.

BRIEF DESCRIPTION OF DRAWINGS

FIG. 4 is an example of a process performed in a data synchronization unit.

DESCRIPTION OF EMBODIMENTS

Exemplary embodiments of a sensor relay control device according to the present invention will be explained below in detail with reference to the accompanying drawings. The present invention is not limited to the embodiments.

Embodiment

Figure 1:
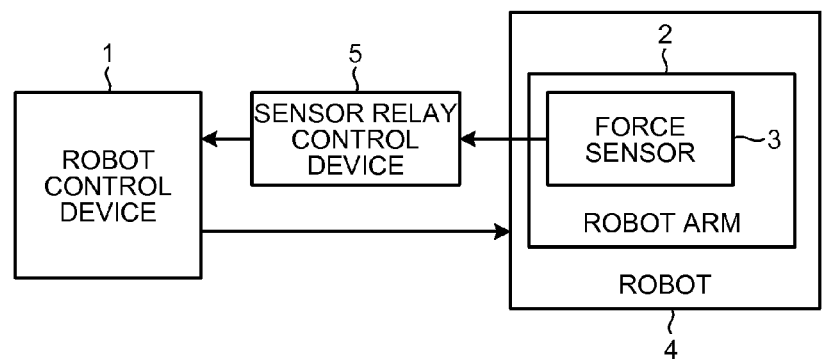
FIG. 1 depicts a connection mode of a sensor relay control device according to an embodiment of the present invention.

FIG. 1 depicts a connection mode of a sensor relay control device according to an embodiment of the present invention.

A sensor relay control device 5 is installed between a force sensor 3 as an external sensor and a robot control device 1 and is connected to these devices.

A robot 4 includes a robot arm 2. The force sensor 3 for feedbacking a force applied to a robot work plane into the robot control device 1 is provided on the robot arm 2. For example, the force sensor 3 is provided at a joint (a so-called "wrist") closest to a work plane of the robot arm 2.

Figure 2:
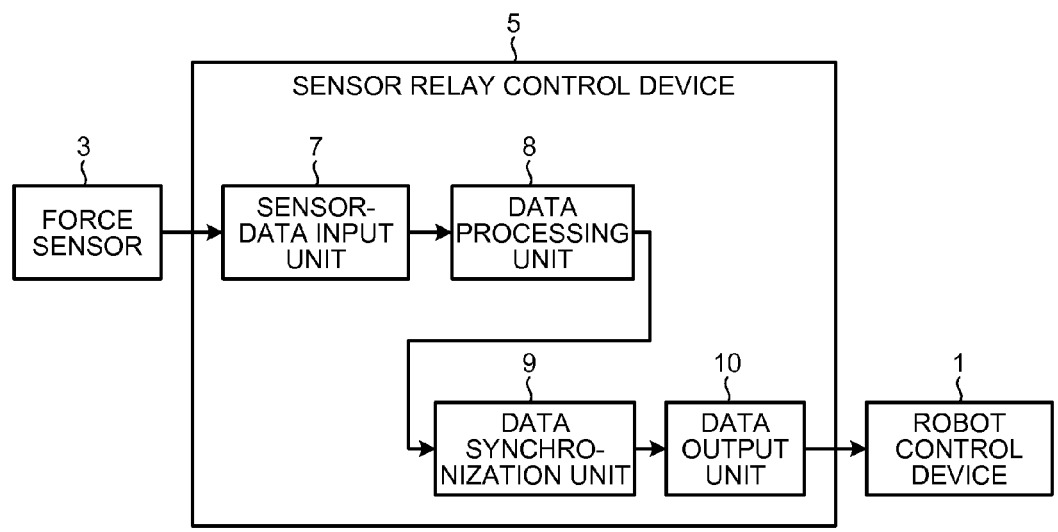
FIG. 2 depicts a configuration of the sensor relay control device according to the embodiment of the present invention.

FIG. 2 depicts a configuration of the sensor relay control device according to the present embodiment. The sensor relay control device 5 includes a sensor-data input unit 7, a data processing unit 8, a data synchronization unit 9, and a data output unit 10. The sensor-data input unit 7 receives input data from the force sensor 3 based on communication specifications of the sensor. The data processing unit 8 converts a data format of the input data received from the force sensor 3 so that the robot control device 1 can handle the input data without performing processing. The data synchronization unit 9 synchronizes the information received from the force sensor 3, which is input asynchronously with a control cycle of the robot 4 in the robot control device 1, with the control cycle of the robot 4. The data output unit 10 transmits the data processed by the sensor-data input unit 7, the data processing unit 8, and the data synchronization unit 9 to the robot control device 1.

The sensor-data input unit 7 receives data conforming to the sensor specifications transmitted from the force sensor 3, and analyzes the input data. An analysis process includes read of the input data and a validity confirmation of the input data (a confirmation whether the data is not broken due to an influence of exogenous noise or the like).

The data processing unit 8 converts the input data received from the force sensor 3, which is read by the sensor-data input unit 7, from the sensor specifications to specifications decodable by the robot control device 1.

Figure 3:
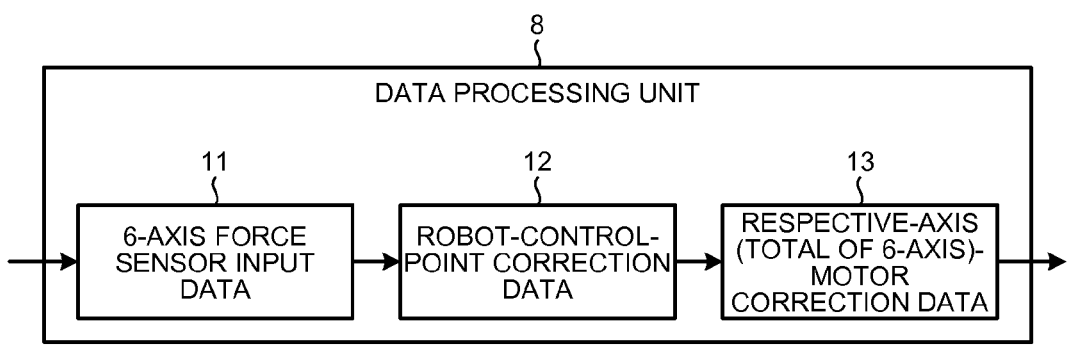
FIG. 3 is an example of a process performed in a data processing unit.

FIG. 3 is an example of a process performed in the data processing unit 8, and depicts a process of converting input data received from a 6-axis force sensor as an example. In FIG. 3, the input data received from the 6-axis force sensor is input as 6-axis force sensor input data 11 including six components, that is, X, Y, Z, Mx (a force around the X axis), My (a force around the Y axis), and Mz (a force around the Z axis) with respect to the center of the sensor. The data processing unit 8 once converts the 6-axis force sensor input data 11 to six components of X, Y, Z, Mx, My, and Mz with respect to a control point of the robot 4 (for example, a flange center position or an end position of a tool such as a hand) to be used as robot-control-point correction data 12.

The data processing unit 8 converts the robot-control-point correction data 12 to correction data for respective axis motors of the robot to obtain respective-axis-motor correction data 13. The respective-axis-motor correction data 13 has data specifications that can be output to the robot control device 1.

In FIG. 2, the data synchronization unit 9 synchronizes the sensor input information (processed information) of specifications for the robot control device received from the data processing unit 8 with the control cycle of the robot 4.

FIG. 4 depicts an example of a process performed in the data synchronization unit 9. In FIG. 4, the sensor cycle and the robot control cycle have fixed values. As a synchronization correction process, a process of dividing the respective-axis-motor correction data according to the control cycle of the robot 4 to calculate optimum correction data corresponding to the control cycle of the robot 4 is performed. For example, linear interpolation is performed based on latest respective-axis-motor correction data and past respective-axis-motor correction data, thereby enabling to predict and calculate the optimum correction data corresponding to the control cycle of the robot 4.

When the sensor cycle is shorter than the control cycle of the robot 4, a process of thinning out the respective-axis-motor correction data is performed, thus it becomes possible to synchronize the respective-axis-motor correction data with the control cycle of the robot 4.

In FIG. 2, the data output unit 10 outputs the data converted by the sensor-data input unit 7, the data processing unit 8, and the data synchronization unit 9 to the robot control device 1.

A plurality of general-purpose communication interfaces (for example, RS-232C and RS-422) are prepared as hardware specifications of the sensor-data input unit 7, and software related to data specifications and a conversion method is added later according to a sensor to be connected, thus it becomes possible to support a wide variety of external sensors. That is, connection of a commercially-supplied external sensor can be achieved by connecting the external sensor via the general-purpose communication interface, and an increase in sourcing costs of the external sensor can be suppressed.

In this manner, the sensor relay control device according to the present embodiment converts input data received from a sensor to information for robot control; and separates processes different from the normal control process, such as data conversion and data synchronization, among processes required at the time of correcting the operation of the robot, from the robot control device 1. Thus it becomes possible to suppress deterioration of the control performance due to the processing load of the robot control, which tends to increase at the time of performing advanced work using the sensor. That is, the robot control device 1 connected to the sensor relay control device according to the present embodiment does not need to perform the process of synchronizing the respective-axis-motor correction data input from the sensor relay control device with the control cycle of the robot 4.

Furthermore, by configuring the sensor relay control device as a dedicated device specialized for the process of processing the input information received from the sensor to be used for the robot control, it becomes easy to improve the processing performance and to provide real-time properties to the process. Because the device does not need to have a function not required for the process of the processing the input information received from the sensor to be used for the robot control, the device can be made smaller than a personal computer. Accordingly, when the device becomes unnecessary, transport for disposal is easy and an amount of generated waste is decreased, which reduces environmental loads.

In the above explanations, the force sensor is cited as an example of the external sensor. However, the present invention can be similarly applied also to a case where an external sensor different from the force sensor, for example, a visual sensor, an orientation sensor, a proximity sensor, or a tactile sensor is used.

REFERENCE SIGNS LIST

1 robot control device
2 robot arm
3 force sensor
4 robot
5 sensor relay control device
7 sensor-data input unit
8 data processing unit
9 data synchronization unit
10 data output unit

11 6-axis force sensor input data
12 robot-control-point correction data
13 respective-axis-motor correction data

The invention claimed is:

1. A sensor relay control device that generates feedback data based on sensor data including a plurality of components and being output by an external sensor installed at a portion of a joint of a robot and is connected to a robot control device that executes feedback control of the robot based on the feedback data, the sensor relay control device comprising:
   a generating unit that imports sensor data output by the external sensor and generates control data of respective axis motors that move the joint of the robot to correspond to respective components of data with respect to a control point of the robot, by a procedure including a step of converting respective components of the imported sensor data to data with respect to the control point;
   a synchronizing unit that synchronizes the control data of the respective axis motors with a control cycle of the robot control device; and
   an outputting unit that outputs the control data of the respective axis motors synchronized with the control cycle of the robot control device to the robot control device as the feedback data.

2. The sensor relay control device according to claim 1, wherein the sensor data output by the external sensor is imported via a general-purpose interface.

* * * * *